(12) United States Patent
Masuda et al.

(10) Patent No.: US 6,173,172 B1
(45) Date of Patent: Jan. 9, 2001

(54) SYSTEM AND METHOD FOR PREVENTING THE UNAUTHORIZED USE OF A MOBILE COMMUNICATION DEVICE

(75) Inventors: Hidehiro Masuda; Yasuaki Mochizuki, both of Tokyo (JP)

(73) Assignee: Nippon Shinpan Co., Ltd., Tokyo (JP)

(*) Notice: Under 35 U.S.C. 154(b), the term of this patent shall be extended for 0 days.

(21) Appl. No.: 08/979,977

(22) Filed: Nov. 26, 1997

(51) Int. Cl.⁷ .................. H04Q 7/20; H04M 1/66
(52) U.S. Cl. ............... 455/410; 455/558; 455/550
(58) Field of Search .................. 455/410, 411, 455/406, 407, 550, 558, 575; 380/23

(56) References Cited

U.S. PATENT DOCUMENTS

| | | | |
|---|---|---|---|
| 5,388,212 | * | 2/1995 | Grube et al. ............... 455/410 |
| 5,423,079 | * | 6/1995 | Namiki et al. ............ 455/410 |
| 5,608,781 | * | 3/1997 | Seiderman ................ 455/410 |
| 5,765,106 | * | 6/1998 | Violante et al. .......... 455/410 |
| 5,862,472 | * | 1/1999 | Park ........................... 455/410 |
| 5,913,175 | * | 6/1999 | Pinault ....................... 455/411 |
| 6,014,085 | * | 1/2000 | Patel .......................... 455/411 |

FOREIGN PATENT DOCUMENTS

| | | |
|---|---|---|
| 4-95421 | 3/1992 | (JP). |
| 5-95329 | 4/1993 | (JP). |
| 5-336109 | 12/1993 | (JP). |
| 6-188829 | 7/1994 | (JP). |
| 6-29920 | 8/1994 | (JP). |
| 7-162954 | 6/1995 | (JP). |

* cited by examiner

Primary Examiner—Edward F. Urban
(74) Attorney, Agent, or Firm—Morrison & Foerster LLP

(57) ABSTRACT

The invention provides for the disabling of a communication device even when information has been obtained unlawfully which is required for communication, such as unique identification information of a communication device (SID) and a unique identification information of a subscriber (PID). The invention provides for the storing as at least a unique identification information of a communication device, a unique identification information of subscriber, and a first identification information derived from the unique identification information of the communication device and the unique identification information of the subscriber into a memory area of mobile communication device; derive a second identification information from the unique identification information of the communication device and the unique identification information of the subscriber being stored, at a time when using the communication device, comparing the first identification information being stored in the communication device and the second identification information and permitting a use of the communication device when the first and second identification information have been matched.

6 Claims, 2 Drawing Sheets

SYSTEM AND METHOD FOR PREVENTING THE UNAUTHORIZED USE OF A MOBILE COMMUNICATION DEVICE

BACKGROUND OF THE INVENTION

1. Field of the Invention

The present invention relates to a technology for preventing a telephone number of a regular subscriber in a so-called mobile communication device such as a portable telephone, automobile telephone, and a personal handy phone (PHS) and thereby avoiding an accounting associated with a communication therefrom.

2. Description of the Related Art

In a mobile communication of a portable telephone and an automobile telephone and the like, in order to manage a location information of a communication device and an accounting of a communication fee, it is necessary to transmit the information of a unique identification information of a communication device (SID) and a unique identification information of a subscriber (PID) and the like to a relay station, and the relay station which as received these information will send out a calling signal composed of these identification information and an identification number of a specified telephone call channel to an exchange station. The exchange station will isolate a home memory station of a subscriber from these identification information, then by accessing the subscriber data, will check to see whether it is a regular subscriber who may be allowed to connect. When it is judged of to be connectable, then that telephone call will be permitted.

According to these conventional methods, there have been existed some dangers of being communicated unlawfully with producing a replica, by receiving a dispatched information for the mobile device, deciphering the identification of the SID and PID and the like, then transporting said information to a completely different portable telephone. The encryptions, which will make the decryptions of these dispatched information difficult, have been studied, but prevention of the information decryptions with encryptions has a limitation.

SUMMARY OF THE INVENTION

An object of the present invention is to provide means for disabling a communication of other than a regular subscriber, even when necessary information for communication has been unlawfully obtained, such as the unique identification information as the communication device (SID) and the unique identification information as the subscriber (PID) and the like.

The present invention is a method and a means, in the mobile communication device of the portable telephone and the automobile telephone and the like, for storing a first identification information derived from the unique identification information as the communication device provided to each communication device and the unique identification information as the subscriber provided to each subscriber, for deriving a second identification information from the unique identification information as the communication device provided to each communication device and the unique identification information as the subscriber provided to each subscriber, at each time when implementing a communication, for comparing the first identification information and the second identification information, and for permitting a use thereof when these are matched, thereby preventing a use of a mobile communication device produced unlawfully, including:

a method of preventing a unauthorized use of a mobile communication device, comprising;

storing at least a unique identification information as a communication device, a unique identification information as a subscriber, and a first identification information derived from the unique identification information as the communication device and the unique identification information as the subscriber into a memory area of a mobile communication device;

deriving a second identification information from the unique identification information as the communication device and the unique identification information as the subscriber being stored, at a time when using said communication device;

comparing the first identification information being stored in said communication device and the second identification information derived from a means for deriving the second identification information; and permitting a use of said communication device when they have matched, and a unauthorized use prevention system of a mobile communication device of a portable telephone and the like, comprising:

a mobile communication device into which at least a unique identification information as a communication device, a unique identification information as a subscriber, and a first identification information derived from the unique identification information as the communication device and the unique identification information as the subscriber are being stored;

means for reading stored information;

means for deriving a second identification information from the unique identification information as the communication device and the unique identification information as the subscriber being stored in said mobile communication device;

means for comparing the first identification information being stored in said communication device and the second identification information derived from said means for deriving the second identification information; and means for permitting a use of said communication device when a result of comparison by said means for comparing has matched, and a method of preventing a unauthorized use of a mobile communication device, and a unauthorized use prevention system of a mobile communication device, wherein when a result of comparing the first identification information and the second identification information has not matched, then disabling a use of said communication device thereafter.

DESCRIPTION OF THE PREFERRED EMBODIMENT

Figure 1:
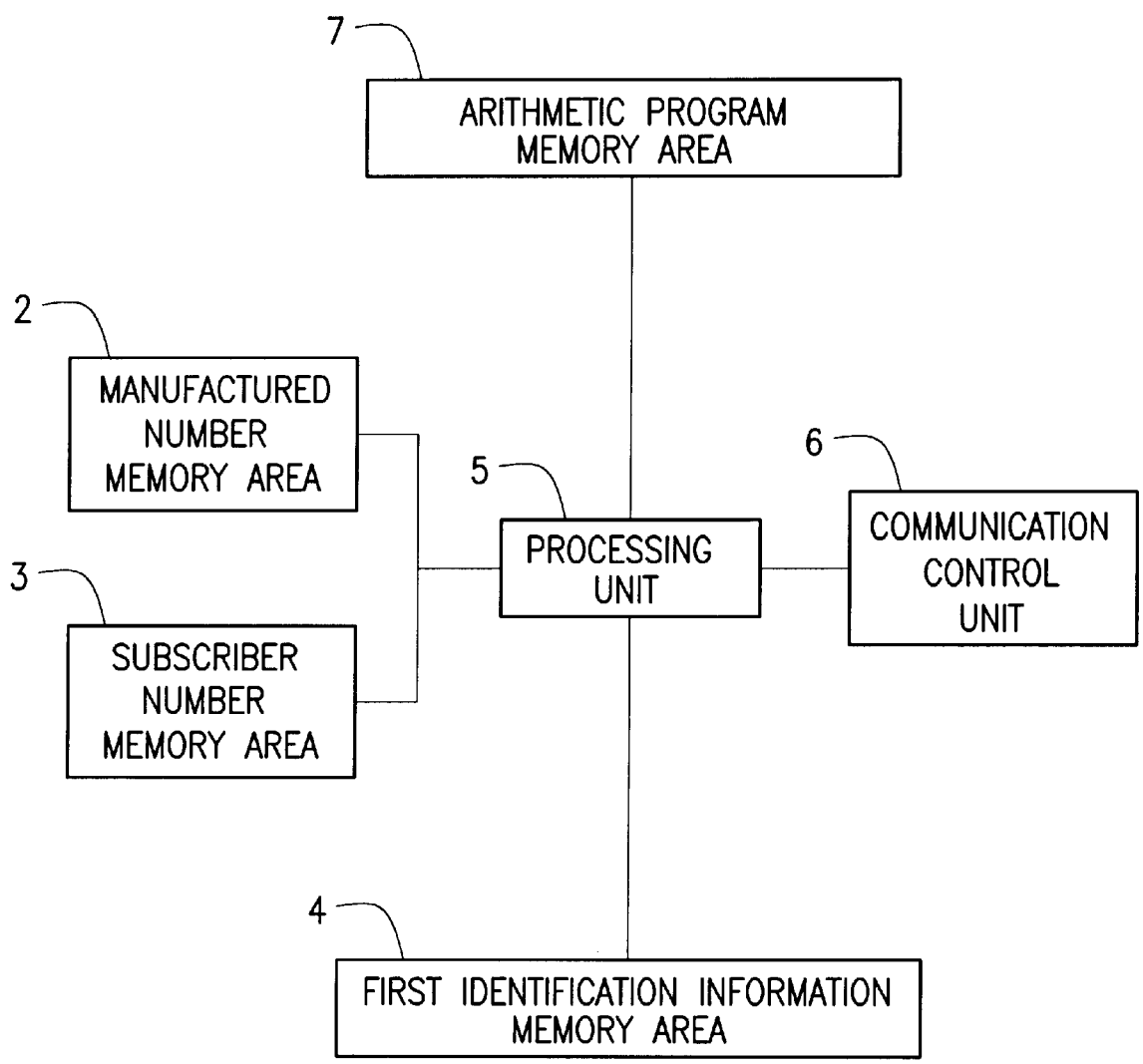
FIG. 1 is a block diagram showing a main part of a communication device of an embodiment of the present invention.
Figure 2:
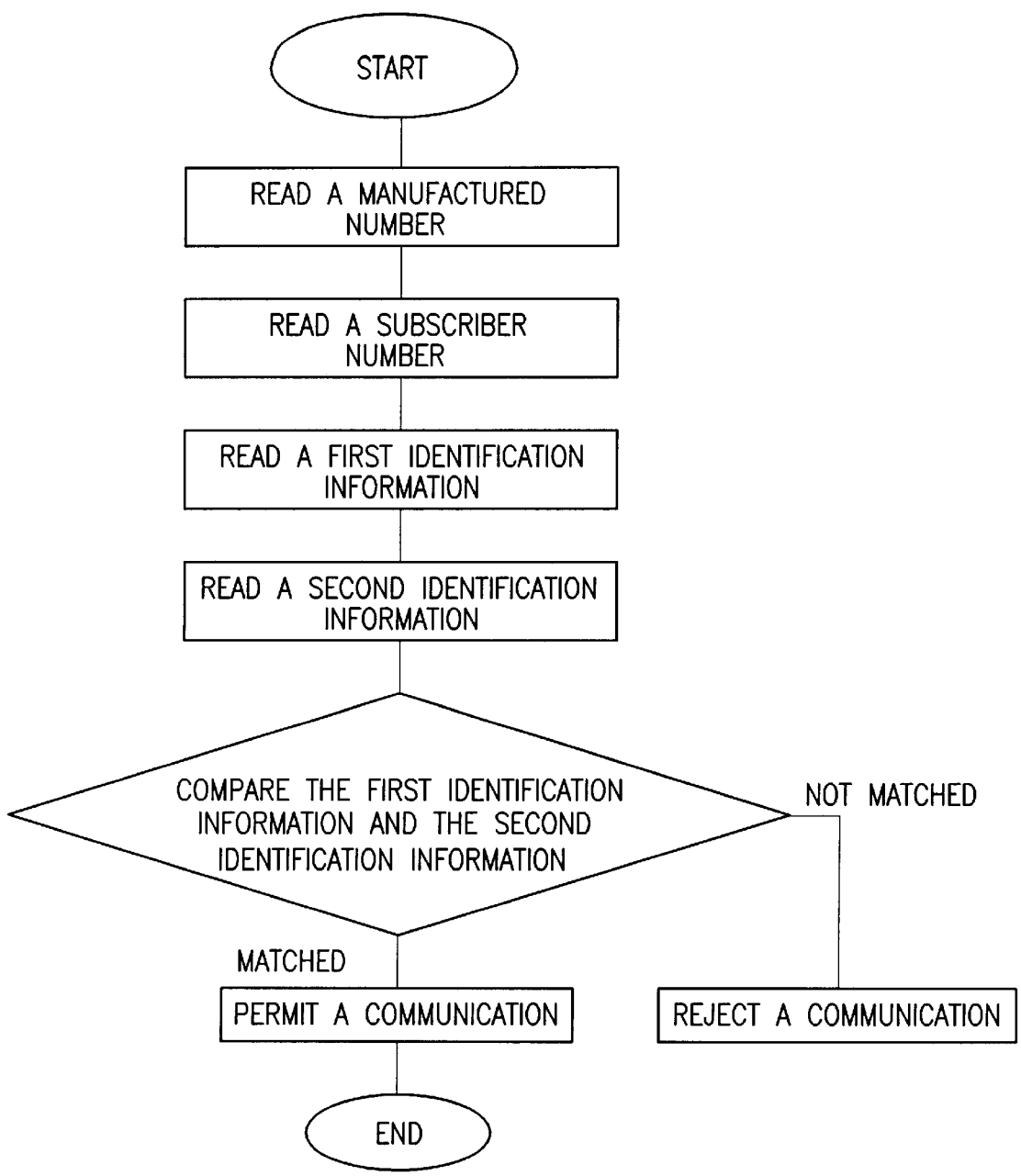
FIG. 2 is a diagram showing a processing flow of an embodiment of the present invention.

FIG. 1 is a block diagram of an embodiment of the present invention, showing a main part relating to the present invention of a mobile communication device of a portable telephone, a PHS (Personal Handy Phone) and an automobile telephone and the like, and FIG. 2 is a diagram showing a flow of processes of this embodiment. In the figure, a numeral 2 indicates a number memory area inherent to a communication device, a numeral 3 indicates a number memory area inherent to a subscriber, a numeral 4 indicates a first identification information memory area, a numeral 5 indicates a processing unit, a numeral 6 indicates a communication control unit, and a numeral 7 indicates an arithmetic program memory area.

In a mobile communication device, a manufactured number "5161" is stored in the memory area 2 as a number inherent to the communication device during a manufacturing process. The memory area is configured with a unreloadable ROM. A subscriber number "3210" would be stored into the subscriber number memory area 3 at a time when a user has subscribed a mobile communication service. A first identification information "8371" which has been derived by an arithmetic from the manufactured number "5161" and the subscriber number "3210" is stored into the first identification information memory area 4. In this example, the arithmetic is assumed to be a simple addition in order to simplify a description, but of course other arithmetic may be carried out optionally.

When making a communication, the processing unit 5 reads the manufactured number "5161" stored in the manufacturing number memory area 2 and the subscriber number "3210" stored in the subscriber number memory area 3 in accordance with an arithmeticequation stored in the arithmetic program memory area 7, and then derives a second identification information "8371". Next, the processing unit 5 compares the second identification information with the first identification information "8371" stored in the first identification information memory area 4 in accordance with a program stored in the memory area 7, and then transmits to the communication control unit 6 an information that permits a telephone call as a result of these being matched, thereby starting a telephone call.

Assuming that when a person, who has unlawfully obtained the mobile communication device having the manufactured number "4702" misappropriating the device, etc., has attempted to use the communication device unlawfully, it could not be used just as it is since a person who has lost it would cancel his/her own subscriber number. Accordingly, a unlawful acquisitor will attempt to make a communication by rewriting a numerical value in the subscriber number memory area to a new subscriber number "3210" of a unrelated person. In such a case, the processing unit 5 reads the subscriber number "3210" stored in the subscriber number memory area and the manufactured number "4702" stored in the manufactured number memory area 2 and derives a second identification information "7912". Subsequently, the first identification information "8371" stored in the first identification information memory area 4 is read and compared with the second identification information "7912", but since a comparison result could not be matched, an information of objecting the communication is transmitted to the communication control unit 6, so as to cancel the communication.

Furthermore, in the same manner, even when a unauthorized user has isolated the number inherent to the communication device and the subscriber number by intercepting a regular communication and transported both of these into a unlawful communication device, the processing unit 5 derives a second identification information from these transported information, and further compares it with the value in the first identification information memory area 4, but since the comparison result would not be matched, thereby the unauthorized use can be prevented as before.

For preventing a use by this unlawful transport, it will be much better since it cannot be used for other communication device even when a specific communication device has been obtained and an arithmetic equation thereof has been deciphered, by having differed the arithmetic equations which respectively derive the first and second identification information for each of the communication devices.

As the result of such as these checks, for example, when having mismatched three times, a use of the communication device can be disabled thereafter, by implementing a provision that the data in the specific memory area would be erased completely, or no rewrite can be made therein, and so on.

According to the present invention, even when having attempted to make a communication by writing the subscriber number into the communication device other than the communication device with the original manufactured number, a prevention of communicating unlawfully could be made possible with an existence of a first identification information derived from a relation of the number inherent to the subscriber (PID) and the number inherent to the communication device (SID). Also, a prevention of unauthorized use can be implemented even when both numbers of the subscriber number and the manufactured number are isolated by intercepting the communication. Further, since this first identification information (the same for the second identification information) is the one which would be derived from two variables such as the number inherent to the subscriber and the number inherent to the communication device, a possibility of these being deciphered is very little, and furthermore a security is much higher by modifying the arithmetic equations which derive these, for each of the communication devices.

This first identification information is used for deciding a correctness of a communication device use, and is not necessary for an accounting associated with a communication and a location confirmation of a communication device at all, and is not required to be dispatched as a communication signal, thereby, there is no danger of being revealed to a third party by an interception of the communication signal and so forth. Therefore, by implementing the present invention, it is possible to provide a system of a mobile communication with a remarkably high security.

What is claimed is:

1. A method of preventing an unauthorized use of a mobile communication device comprising:

storing unique identification information of a communication device, unique identification information of a subscriber and a first identification information derived from the unique identification information of the communication device and the unique identification information of the subscriber into at least one memory storage area of a mobile communication device;

deriving a second identification information from the unique identification of the communication device and the unique identification information of the subscriber being stored at a time when said communication device is in use;

wherein said second identification information is derived within said device;

comparing the first identification information stored in said communication device and the second identification information; and permitting use of said communication device based upon the comparison of said first and second identification information when they match.

2. A method of preventing the unauthorized use of a mobile communication device according to claim 1, further comprising, when a result of comparing the first identification information and the second identification has not matched, subsequently disabling the use of said communication device.

3. A method of preventing the unauthorized use of a mobile communication device according to claim 1, further comprising, when a result of comparing the first identification information and the second identification has not matched, subsequently disabling the use of said communication device.

4. A unauthorized use prevention system of a mobile communication device, comprising:

a mobile communication device in which at least unique identification information of a communication device, unique identification information of a subscriber, and a first identification information derived from the unique identification information of the communication device and the unique identification information of the subscriber are stored;

means for reading said stored information:

means for deriving a second identification information from the unique identification information of the communication device and the unique identification information of the subscriber stored in said mobile communication device;

wherein said second identification information is derived within said device;

means for comparing the first identification information stored in said communication device and the second identification information derived by said means for deriving the second identification information; and means for permitting use of said communication device when said first and second identification information are found to match by said means for comparing.

5. A unauthorized use prevention system of a mobile communication device according to claim 4, wherein, when a result of comparing the first identification information and the second identification information has not matched, subsequently disabling the use of said communication device.

6. A method of preventing an unauthorized use of a mobile communication device comprising:

storing unique identification information of a communication device, unique identification information of a subscriber and a first identification information derived from the unique identification information of the communication device and the unique identification information of the subscriber into at least one memory storage area of a mobile communication device;

deriving a second identification information from the unique identification of the communication device and the unique identification information of the subscriber being stored at a time when said communication device is in use;

comparing the first identification information stored in said communication device and the second identification information;

permitting use of said communication device based upon the comparison of said first and second identification information when they match; and wherein said comparison occurs within said device.

* * * * *

UNITED STATES PATENT AND TRADEMARK OFFICE
CERTIFICATE OF CORRECTION

PATENT NO. : 6,173,172 B1 Page 1 of 1
DATED : January 9, 2001
INVENTOR(S) : Hidehiro Masuda et al.

It is certified that error appears in the above-identified patent and that said Letters Patent is hereby corrected as shown below:

Claim 3,
Line 2, change "claim 1" to -- claim 5 --.

Claim 5,
Line 2, change "claim 4" to -- claim 2 --.

Signed and Sealed this

Twenty-ninth Day of January, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,173,172 B1
DATED : January 9, 2001
INVENTOR(S) : Hidehiro Masuda et al.

It is certified that error appears in the above-identified patent and that said Letters Patent is hereby corrected as shown below:

Column 5,
Line 8, change "claim 1" to -- claim 6 --.

Column 6,
Line 5, change "claim 4" to -- claim 2 --.

This certificate supersedes Certificate of Correction issued January 29, 2002.

Signed and Sealed this

Twenty-third Day of August, 2005

JON W. DUDAS
*Director of the United States Patent and Trademark Office*